(12) United States Patent
Hippen et al.

(10) Patent No.: US 7,946,118 B2
(45) Date of Patent: May 24, 2011

(54) COOLING AN ELECTRICALLY CONTROLLED TURBOCHARGER

(75) Inventors: Will Hippen, Santa Barbara, CA (US);
Franz Laimboeck, Goleta, CA (US);
Tyler Garrard, Buellton, CA (US)

(73) Assignee: EcoMotors International, Allen Park, MI (US)

( * ) Notice: Subject to any disclaimer, the term of this patent is extended or adjusted under 35 U.S.C. 154(b) by 0 days.

(21) Appl. No.: 12/840,737

(22) Filed: Jul. 21, 2010

(65) Prior Publication Data

US 2010/0284824 A1   Nov. 11, 2010

Related U.S. Application Data

(63) Continuation-in-part of application No. 12/417,568, filed on Apr. 2, 2009.

(51) Int. Cl.
*F02B 33/44* (2006.01)
*F02B 39/14* (2006.01)
*F04B 17/00* (2006.01)
*F04B 35/00* (2006.01)
*F04B 49/06* (2006.01)
*F01M 1/00* (2006.01)
*F01M 1/10* (2006.01)

(52) U.S. Cl. ........... 60/605.3; 60/607; 60/608; 417/407; 417/44.1; 417/366; 184/6.24; 184/6.16

(58) Field of Classification Search ........... 60/607–608, 60/605.3, 597; 417/407, 44.1, 366; 310/524, 310/58, 43, 261, 214, 261.001; 184/6.11, 184/6.16, 6.24

See application file for complete search history.

(56) References Cited

U.S. PATENT DOCUMENTS

| | | | | |
|---|---|---|---|---|
| 2,970,750 A | * | 2/1961 | Swearingen | 415/1 |
| 3,090,544 A | * | 5/1963 | Woollenweber, Jr. et al. | 184/6.16 |
| 3,490,735 A | * | 1/1970 | Hansen et al. | 251/214 |
| 3,827,236 A | | 8/1974 | Rust | 60/605.3 |
| 3,834,156 A | * | 9/1974 | Cutler et al. | 417/407 |
| 4,142,608 A | | 3/1979 | Sarle | 184/6.11 |
| 4,329,000 A | | 5/1982 | Keske | 308/187 |
| 4,480,440 A | * | 11/1984 | Harper et al. | 417/407 |
| 4,752,193 A | | 6/1988 | Horler | 184/6.11 |

(Continued)

FOREIGN PATENT DOCUMENTS

DE   2854762 A1 *   6/1980

(Continued)

OTHER PUBLICATIONS

A Machine Translation JP 2007-239568 A, pubhished on Sep. 20, 2007.*

(Continued)

*Primary Examiner* — Thai Ba Trieu
(74) *Attorney, Agent, or Firm* — Diana D. Brehob

(57) ABSTRACT

An electrically controlled turbocharger has a motor mounted on a shaft in a motor housing between a turbine and compressor. Oil is sprayed onto the motor stator to cool the stator. An oil gallery is disposed above the stator to receive lubricating oil and contains apertures that perform as jets to allow oil to be sprayed directly on the motor stator. A coolant jacket is formed in the turbocharger housing between the turbine and the motor to allow liquid coolant to circulate therein and dissipate heat from the turbine end prior to reaching the motor components. Other embodiments provide for a stator component to be submerged in flowing cooling oil.

17 Claims, 11 Drawing Sheets

U.S. PATENT DOCUMENTS

| | | | | |
|---|---|---|---|---|
| 4,940,114 | A | 7/1990 | Albrecht | 184/6.3 |
| 5,121,605 | A | 6/1992 | Oda et al. | 60/608 |
| 5,133,326 | A | 7/1992 | Nishimura et al. | 123/559.3 |
| 5,429,085 | A | 7/1995 | Stauffer | 123/245 |
| 5,499,693 | A * | 3/1996 | Widenhorn | 184/6.24 |
| 5,771,695 | A | 6/1998 | Halimi | 60/607 |
| 5,870,894 | A | 2/1999 | Woollenweber | 60/607 |
| 5,906,098 | A | 5/1999 | Woollenweber | 60/608 |
| 6,085,527 | A | 7/2000 | Woollenweber | 60/607 |
| 6,305,169 | B1 | 10/2001 | Mallof | 60/608 |
| 6,709,160 | B1 * | 3/2004 | Ward et al. | 384/286 |
| 6,943,468 | B2 | 9/2005 | Iida | 310/54 |
| 6,994,796 | B2 * | 2/2006 | Wall | 210/791 |
| 7,469,689 | B1 | 12/2008 | Jones | 123/559.1 |
| 2004/0084979 | A1 | 5/2004 | Hughes | |
| 2006/0075751 | A1 | 4/2006 | Bender | |
| 2007/0081906 | A1 | 4/2007 | Wood | 60/605.3 |
| 2007/0110349 | A1 * | 5/2007 | Groves | 384/368 |
| 2009/0016911 | A1 * | 1/2009 | Noelle | 417/407 |
| 2010/0308685 | A1 * | 12/2010 | Hippen et al. | 310/214 |

FOREIGN PATENT DOCUMENTS

| | | | | |
|---|---|---|---|---|
| DE | 3923239 | A1 * | 1/1990 | |
| JP | 2004108213 | A * | 4/2004 | |
| JP | 2006009685 | A * | 1/2006 | |
| JP | 2007239568 | A * | 9/2007 | |
| JP | 2007309101 | A * | 11/2007 | |
| JP | 2008095650 | A * | 4/2008 | |
| JP | 2008115731 | A * | 5/2008 | |
| JP | 2008121466 | A * | 5/2008 | |
| JP | 2008128112 | A * | 6/2008 | |

OTHER PUBLICATIONS

SAE 2003-01-2294 Diesel Engine Electric Turbo Compound Technology by Ulrich Hopman and Marcelo Algrain.

* cited by examiner

COOLING AN ELECTRICALLY CONTROLLED TURBOCHARGER

RELATED APPLICATIONS

This application is a continuation in part of U.S. Ser. No. 12/417,568 filed Apr. 2, 2009 and is related to PTC application PCT/US2010/020707 filed Jan. 12, 2010, each of which are incorporated herein by reference.

BACKGROUND

1. Field

Electrically controlled, engine exhaust gas turbochargers.

2. Description of the Related Art

Turbochargers use an engine's own exhaust gases to compress and, thus, increase the volume of air entering the engine to increase engine efficiency.

Engine exhaust gases from the exhaust manifold drive a turbine at high speed. Turbine rotation rotates a shaft, which is shared with a compressor. The compressor compresses outside air and delivers it to the engine's intake manifold. Compression causes more air and thus more oxygen to enter each combustion cylinder. Consequently, the engine operates more efficiently, at higher horsepower and torque and with lower cylinder displacement than conventionally aspirated engines. Thus, lighter engines using less fuel can provide equal performance than engines without a turbocharger provide.

Few diesel engines in new vehicles today operate without a turbocharger. Turbochargers also are becoming more common on gasoline engines. Other, non-vehicle engines also benefit from turbochargers.

At low engine revolutions, the exhaust flow may not drive the turbocharger sufficiently to obtain sufficient compressor rotation to force enough air from the compressor to the engine's intake manifold. Thus, when a driver accelerates quickly from idle or low engine revolutions to high engine revolution, a turbocharger lags until the volume of exhaust gases from the higher engine revolutions reaches the turbocharger. Accordingly, just when an engine is called upon to deliver more power, the lagging turbocharger supplies less then the desired airflow to the engine's combustion cylinders.

Because of these issues, some have proposed that turbochargers operate under electrical control from an electric motor within the turbocharger. See, for example, Kawamura, U.S. Pat. No. 4,769,993 (1988) and Halimi, U.S. Pat. No. 5,605,045 (1997). At idle when the driver wants to accelerate rapidly, an electric motor can accelerate the compressor quickly to supply sufficient air to the intake manifold and the combustion cylinders. After the engine reaches higher rpm and produces higher exhaust volume for adequate turbine rotation, the turbocharger does not rely on the motor. Then, the motor could function as a generator or an alternator and convert the turbocharger's rotary motion into electrical energy to supply at least part of the vehicle's electrical needs. For example, the motor functioning as a generator or an alternator could charge batteries or supply other electrical needs of a hybrid vehicle.

Significant challenges still exist so that the motor continues to function in the harsh, high temperature, high speed environment of a turbocharger. The high gas temperatures on the turbine side of a turbocharger ($\approx 1050°$ C. in gasoline engines; lower in diesel engines), adversely affects the entire structure. In addition, the compressor side of the turbocharger causes significant temperature increases because the increase in air pressure raises the air temperature, up to an increase of about 180° C. Moreover, resistance heating in the motor's stator adds to the turbocharger's heat load.

Turbocharger manufactures have built standard turbochargers with designs and materials to account for these high temperatures. Nevertheless, those structures and materials may not protect internal motors inside electrically controlled turbochargers adequately.

High temperatures affect the motor in several ways. Insulation on the electromagnets' coil wiring can melt. The melting exposes bare wiring and can short the coils. If the motor shorts, the electrically controlled turbocharger fails to function. Electric resistance of copper wire also increases linearly with increased temperature. This higher resistance at high temperatures decreases motor efficiency and causes the coils to generate more of their own heat.

High-speed rotation also causes problems. Because the turbine and compressor are adjacent each other in conventional (non-electrically controlled) turbochargers, the shaft connecting the turbine and compressor is relatively short. With longer shafts accommodating an electric motor, slight imperfections in the shaft become magnified at the high rotational speed at which turbochargers can operate. Centrifugal force follows the following equation:

$$F = m \cdot \omega^2 r \tag{1}$$

where m is the mass, $\Omega$ is the rotational speed (in radians per unit time) and r is the radius. For a rotating shaft assembly mass, the equation becomes more complex. Nevertheless, the equation still shows that as the shaft's radius increases, which increases the mass, the centrifugal force also increases. In addition, as the shaft length increase, the shaft becomes more flexible and its natural frequencies drop. Thus, resonance may occur at lower speeds.

Unless the shaft is perfectly round and uniform, resulting unbalances cause centrifugal force, which tends to vibrate the shaft. Any oil residing on the shaft—oil within the motor housing is discussed later in this application—also may lead to slight imbalances of the shaft. As the shaft passes through natural frequencies, unbalances can amplify resonances that can affect the turbocharger adversely.

Figure 1:
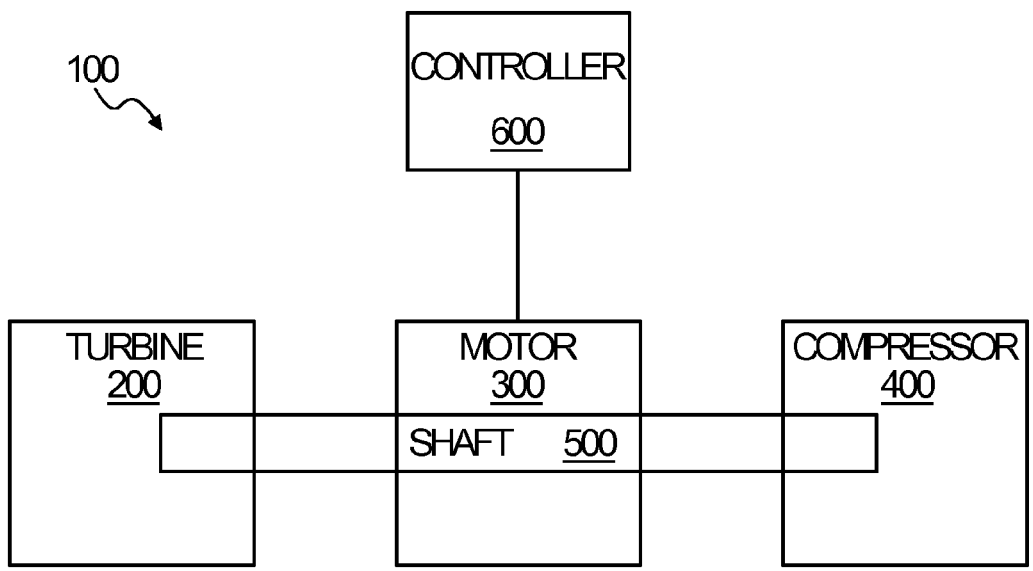
FIG. 1 is a block diagram of an electrically controlled turbocharger.

When detailed descriptions discuss a reference numeral in one or more drawing figures, the element being discussed is visible in that drawing. The element also may be visible in other figures. In addition, to avoid crowding of reference numerals, one drawing may not use a particular reference numeral where the same element is in another drawing with the reference numeral.

DETAILED DESCRIPTION

Figure 5:
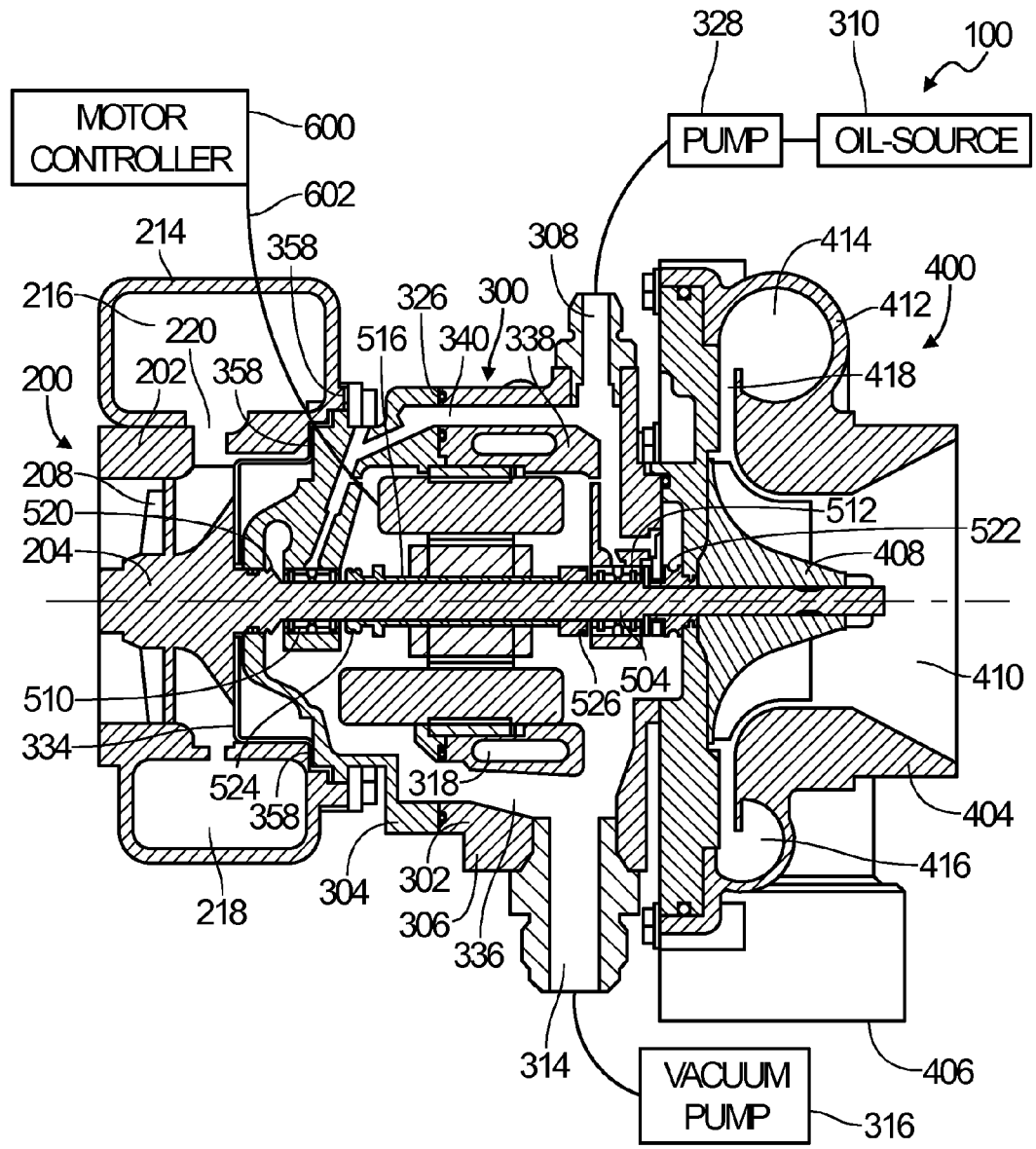
FIG. 5 is a cross-section view of the electrically controlled turbocharger.

In the FIG. 1 block diagram, electrically controlled turbocharger 100 comprises a turbine 200, a compressor 400, a motor 300, a shaft assembly 500 and a controller 600. Motor 300 may be disposed between the turbine 200 and compressor 400, and shaft assembly 500 interconnects turbine 200, compressor 400 and motor 300. The turbine and compressor may be respectively secured to the motor to form a single unit. The turbine, compressor, motor and shaft assembly may have other relative physical arrangements. The controller 600 controls operation of the motor 300 through connection 602 (FIG. 5).

Figure 2:
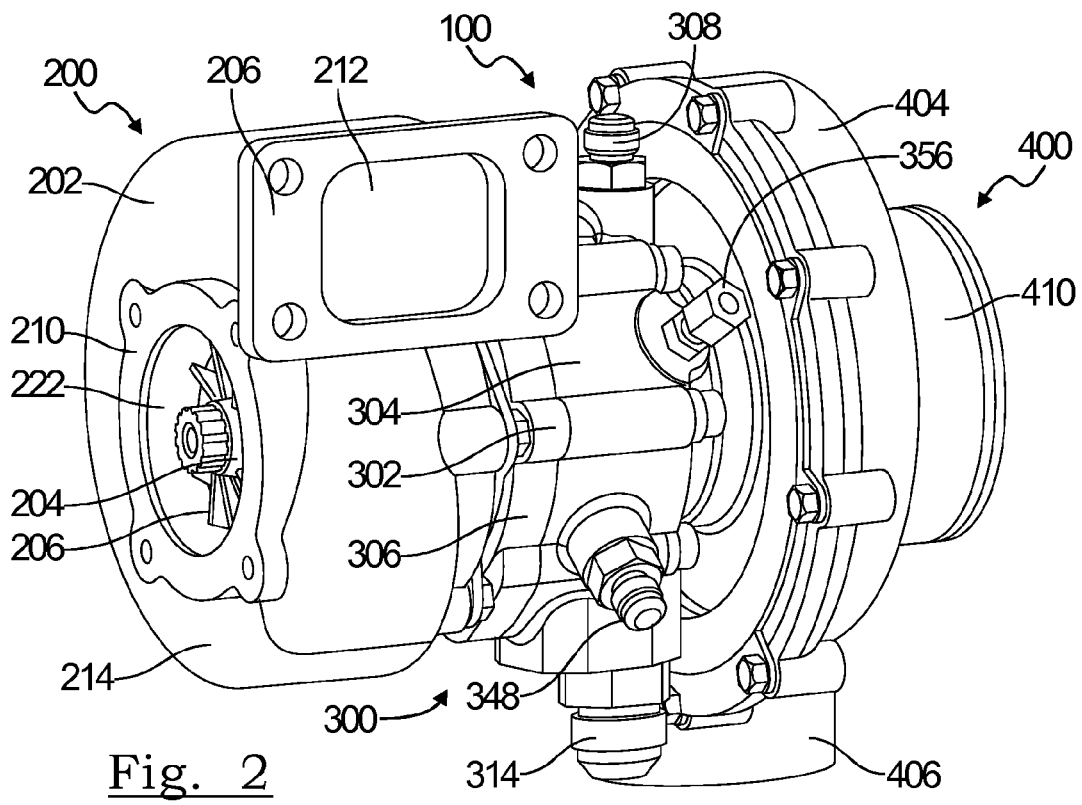
FIGS. 2 and 3 are external perspective views of the electrically controlled turbocharger.
Figure 3:
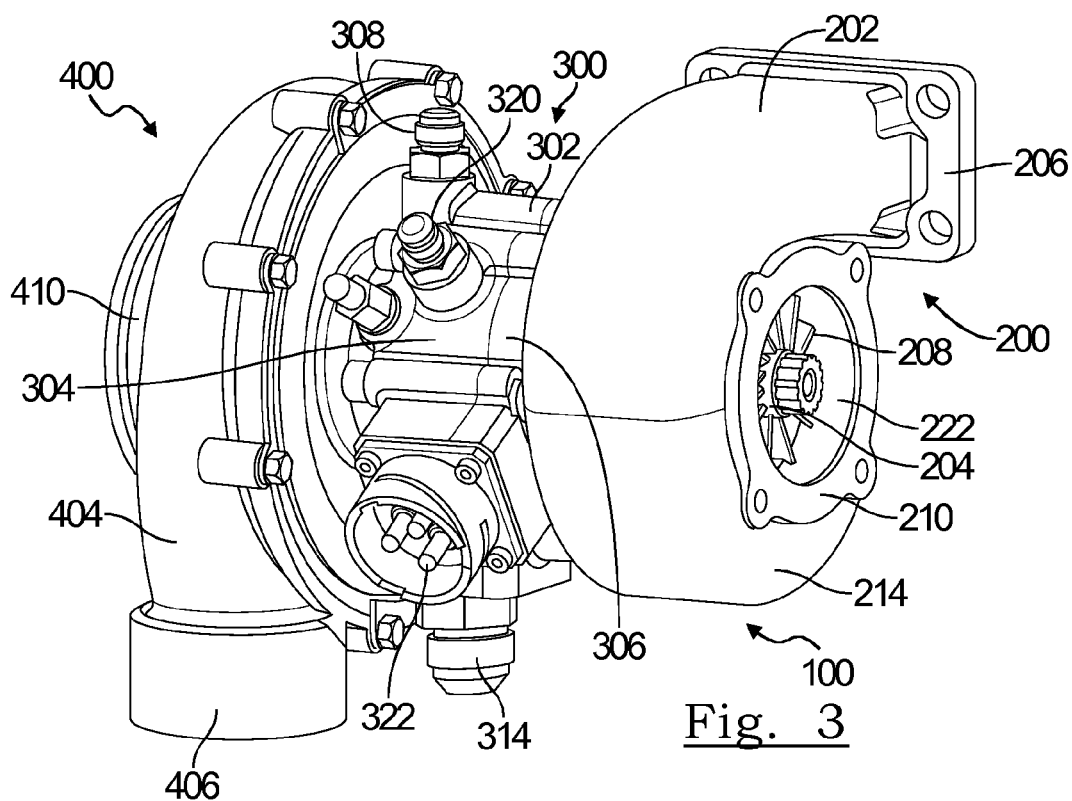
Figure 4:
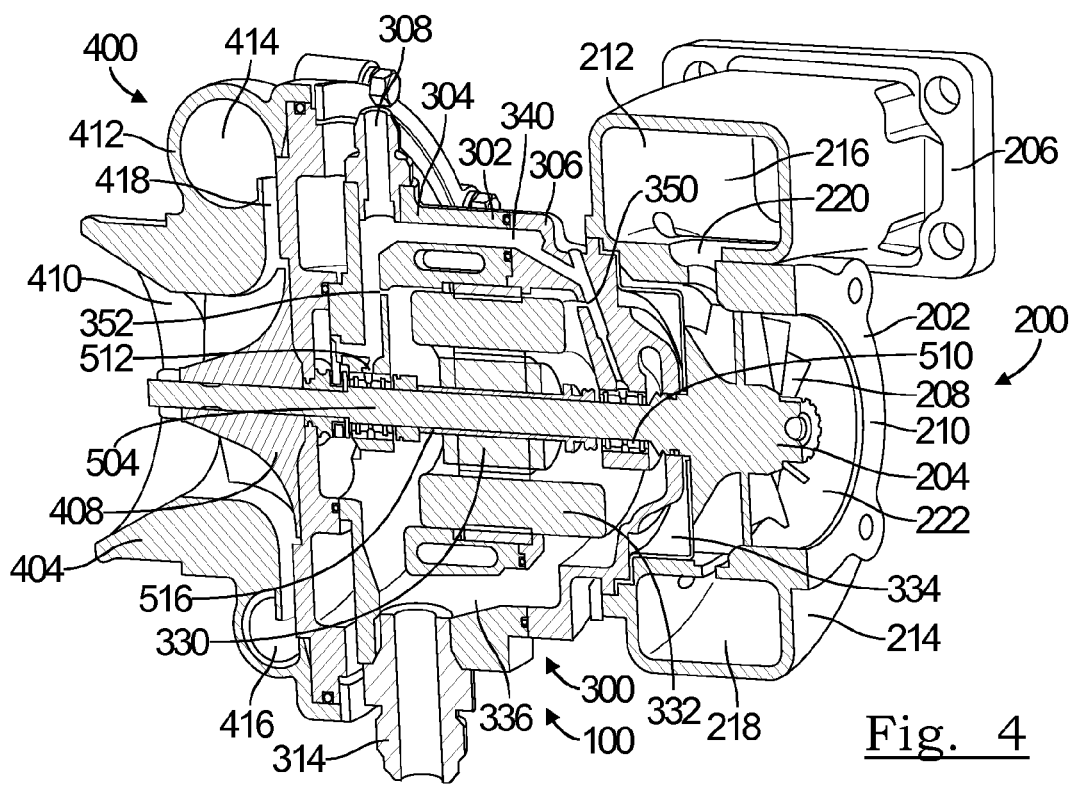
FIG. 4 is a cut-away view of the electrically controlled turbocharger.

In the FIGS. 2 and 3 external perspective views of the electrically controlled turbocharger 100, housing 202 of turbine 200 includes inlet flange 206 at inlet 212. Exhaust gases from an engine (not shown) enter the inlet and flow through volute 214 (see also FIGS. 4 and 5). The volute may provide a spiral path for the incoming exhaust gases and, therefore, may have a decreasing dimension toward the center. Compare the dimensions at 216 and 218 (FIGS. 4 and 5). This decreasing dimension decreases the cross-sectional area of the volute as it spirals inward, which in normal operation causes increased velocity of the exhaust gases. Depending on the circumstances, it may be desirable for the volute to have some other shape.

Figure 7:
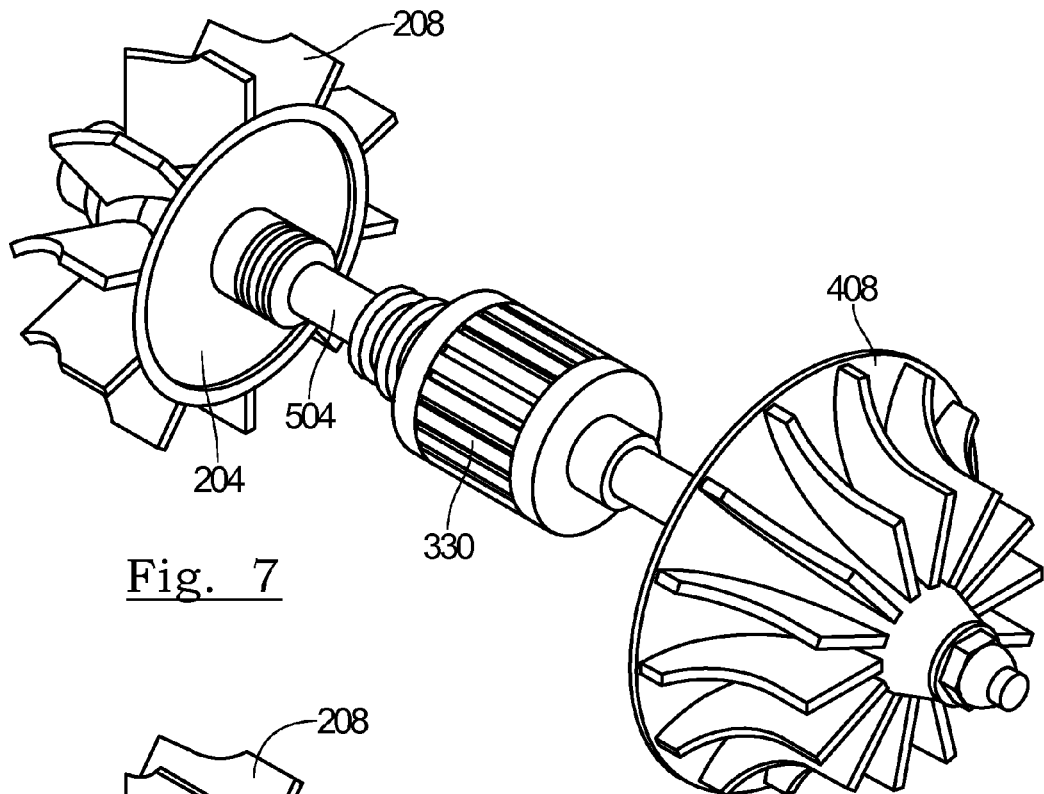
FIG. 7 is a perspective view of the turbocharger shaft, motor rotor and the moving parts of the turbine and compressor.
Figure 8:
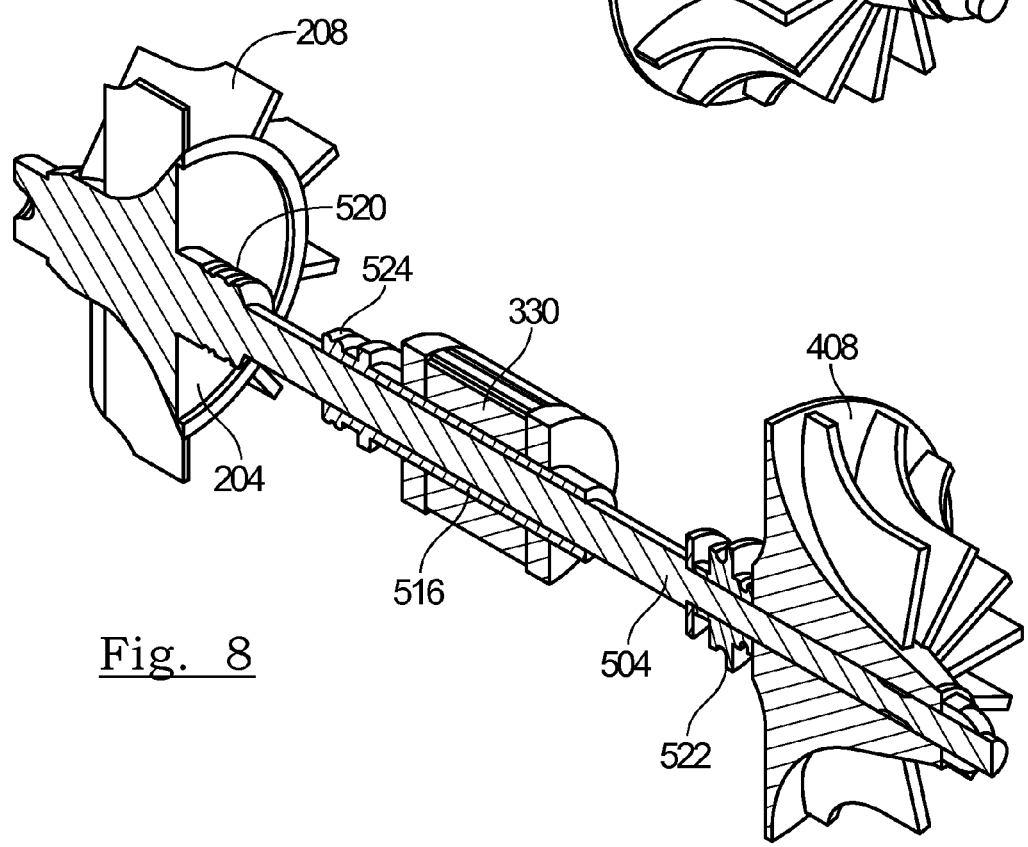
FIG. 8 is a perspective, cutaway view of the turbocharger shaft, motor rotor and the moving parts of the turbine and compressor.
Figure 9:
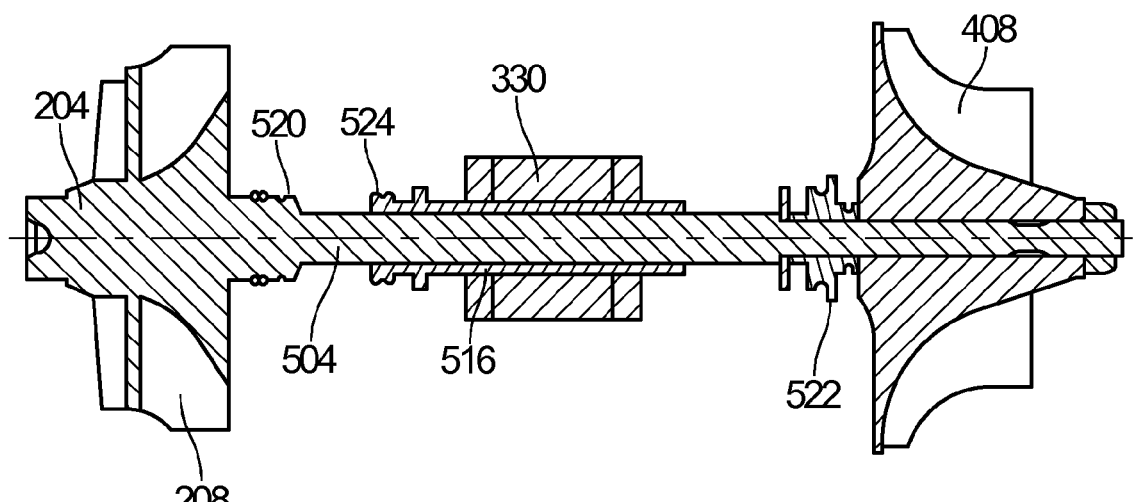
FIG. 9 is a sectional view of the turbocharger shaft, motor rotor and the moving parts of the turbine and compressor.

Volute 214 may have an inward-facing, tapered opening 220 (FIG. 4) communicating with the central portion 222 of turbine housing 202. Turbine wheel 204 has turbine blades 208 spaced around the turbine wheel. When exhaust gases pass though opening 220 from the volute, the gases push the turbine blades and cause the turbine wheel to rotate. See also FIGS. 7, 8 and 9 for other views of turbine wheel 204 and turbine blades 208 without the surrounding structure of the turbine housing 202.

Flange 206 may attach to a complimentary fitting on the engine exhaust manifold (not shown) so that exhaust gases enter inlet 212 and volute 214. After the exhaust gases rotate the turbine wheel, the spent gases may pass into an exhaust system, which may include the pollution reduction system, muffler and tailpipe. A portion of the exhaust gases may be directed to the intake manifold to recirculate exhaust gas back into the combustion process. Flange 210 may be provided to attach to the exhaust system.

Turbine housing 202 may be cast iron or another material with a high melting point that maintains its strength when subjected to high temperature exhaust gases, for example, up to ≈0.1050° C.

Turbine 200 may include a wastegate or other features that allow exhaust gases to bypass the turbine. When the turbine would be operating at above a designed output, too much heat and turbine speed can build up, and the compressor could provide too much compressed air to the engine combustion cylinders. The wastegate may solve this problem.

Compressor 400 includes a compressor housing 404 (FIGS. 2, 3 and 4). The compressor may discharge compressed air through an outlet 406 into the engine's intake manifold (not shown). The compressor may include a pressure relief valve (not shown). When the compressor would be operating at above a designed output, too much compressor speed can build up, and the compressor could provide too much compressed air to the engine combustion cylinders. The pressure relief valve may solve this problem.

The compressor 400 includes a compressor wheel 408 (FIGS. 4, 5, 7, 8 and 9). Outside air, e.g., from an air filter (not shown), is passed into the compressor through compressor inlet 410 (FIG. 4). Aperture 418 (FIGS. 4 and 5) communicates with the compressor inlet to direct air to diffuser 412, which may be a spiraling passage that tapers from a smaller internal size at 416 to a larger internal size at 414. The compressor wheel may draw air through inlet 410 and accelerate the air radially through aperture 418 to the diffuser 412. The diffuser increases the air pressure while decreasing its velocity.

Increased air pressure within compressor 400 may cause substantial heating of the air, which may cause compressor housing 404 and other parts within the compressor housing to become very hot. Some of this heat may be conducted to motor 300. An intercooler (not shown) may be provided between the compressor and the intake manifold, but the intercooler's primary function is to lower the air temperature and increase the air density. It normally does not decrease the transmission of heat from the compressor to the motor.

Motor 300 includes a housing 302 (FIGS. 2 through 5), which may be in two sections 304 and 306. The two sections may seal to each other but may be separable to provide internal access, for example for repairs and maintenance and to install the motor during assembly. One or more seals such as O-ring 326 (FIGS. 5 and 6) may seal the two housing sections.

Motor 300 may be an induction motor, a permanent magnet motor, a switched reluctance motor, or other types of motors or electric machine.

Motor 300 may include an oil inlet 308 for receiving oil and an oil drain 314 for passing oil out of the motor. See FIGS. 2 through 6. This oil may lubricate moving parts and cool parts of the motor. Source 310 of oil (shown schematically in FIG. 5) may be engine crankcase oil or a separate oil source. Some engines have engine-driven mechanical pumps that begin pumping oil into the engine when the engine begins operating. Those engines may rely on oil remaining on moving parts after engine shutdown for initial lubrication. Some parts of the turbocharger 100 may benefit from oil under pressure sooner. For example, adequate oil may be more critical for the turbocharger bearings than it is for cooling the turbocharger motor.

Crankcase oil's large volume provides a larger reservoir for dissipating heat from the turbocharger 100, as explained further in this application. The crankcase oil volume also could be increased, for example by one or more liters, to add to heat dissipating ability of the source of oil. An oil cooler also could be used. Conversely, using oil from a separate source prevents that oil from becoming contaminated by any conditions contaminating engine oil.

Whether the oil comes from the engine crankcase or from a separate source, a separate pump 328 (shown schematically in FIG. 5) may pump the oil for the stator and bearings. Such a pump could be electric or mechanical. An electric pump may initiate oil flow before the engine turns over, such as when the driver starts the car but before the engine's controller initiates ignition. This separate oil pump may be beneficial with engines that start and stop frequently such as those in hybrid vehicles. The separate oil pump may be thermostatically controlled and, therefore, may continue to run after engine shutdown until the temperatures in turbocharger 100 drop to acceptable levels.

Motor 300 may include an electrical connector 322 (FIG. 3) on motor housing 302, which provides electrical connections to the motor. Lead 602 from controller 600 (FIG. 5) may connect to the motor through electrical connector 322. The motor also may include coolant inlet 348 (FIG. 2) for receiving coolant and a coolant outlet 320 (FIG. 3) for returning coolant to a radiator or other source of cooling fluid. The cooling system may have a separate electrical or mechanical pump to direct coolant to the coolant inlet 348. That pump also may be under control of controller 600, which may receive data from a thermostat.

Motor housing 304 may be formed of cast iron or other appropriate material. The motor housing may include various internal supports. Cast iron can resist the substantial heat loads without weakening. Nevertheless, a ceramic or other insulator could replace or be used in addition to cast iron where forces on the parts of motor housing are not high. Ceramic may decrease heat flow from the turbine 200 to motor 300 and bearings 510 and 512 (described later and shown in FIG. 5).

When the engine operates at idle or low output and needs power for acceleration, low exhaust output may be insufficient to drive turbine 200 sufficiently to drive compressor 400 adequately. This lag may continue until the engine develops sufficient exhaust to drive the compressor at operating output. Controller 600 (FIG. 5) may receive data about engine conditions such as load, rpm, throttle position, fuel flow and other information and may control electrical power to motor 300. To overcome the lag, the controller may activate the motor to generate torque on shaft assembly 500, which causes the compressor to turn faster and to pressurize air up to the motor's full capacity even at lower engine speeds.

Shaft assembly 500 (FIGS. 2, 3, 6, 7, 8 and 9) includes a shaft 504, which connects to and extends from the turbine 200, through motor 300 and into compressor 400. Torque from exhaust gases acting on blades 208 of turbine wheel 204 causes the shaft to rotate. Rotation of the shaft may result in rotation of the compressor wheel 408.

Motor 300 has a rotor 330 (FIGS. 4 and 6 through 9) on shaft 504 that rotates with shaft rotation. Stator 332 (FIGS. 4 and 6) surrounds the rotor. The stator may have closely packed, insulated wires in coils (not shown) and a lamination stack (not separately illustrated). The material, gauge, winding, insulation and other features of the wire and the properties of the lamination stack may be chosen for their electrical, magnetic, environmental and other factors.

Motor 300 may be subjected to high temperatures from turbine 200 and compressor 400 and from resistance heating in stator 332. To cool the stator, oil may be jetted against the stator through oil jets 350 and 352. The jets are discussed below. The oil comes from oil source 310 (FIG. 5 in schematic), which may be the engine crankcase or a separate oil reservoir. The oil also may be from the same source that lubricates the turbocharger's bearings (described below). The oil flows along the stator 332 into sump 336 (FIGS. 4 and 5) where it collects and flows back to the crankcase or separate oil reservoir.

Radiant heat shield 334 (FIGS. 4 and 6) may be provided to reflect radiant heat from turbine 200 away from motor housing 302 and motor 300. One or more conductive heat shields 358 (shown schematically in FIG. 5) may be provided to resist heat transmission from compressor 400 or turbine 200 to the motor. The conductive heat shield may be ceramic or other appropriate material that resists heat transmission. Radiant heat shields may be metal or other material. Additional heat shields and insulation could be used elsewhere in turbocharger 100.

Turbocharger 100 can use different standard turbocharger turbine and compressor components, or the components may be specially constructed. In addition, turbine 200 and compressor 400 can use variable geometry. Dual sided compressor wheels could be used.

Two bearings 510 and 512 support shaft 504. See FIGS. 4 and 5. To accommodate motor 300 between turbine 200 and compressor 400, the shaft may be longer than standard turbocharger shafts, i.e., turbochargers without motors. This added shaft length may add to the length between bearings 510 and 512. This added length results in a weaker and more flexible shaft. As shaft 504 rotates at high speeds, it may pass through natural frequencies and cause resonance.

Therefore, the shaft assembly 500 may include a shaft stiffener 516, which may be a sleeve around or forming a part of shaft 504. See FIGS. 4, 5, 6, 8 and 9. The rotor may attach through an interference fit to the stiffener rather than directly in contact with shaft 504. The stiffener strengthens the shaft in a way that allows transient operation through, and continuous operation between resonant speeds.

Stiffener 516 may be made of an Inconel® alloy because Inconel also may act as a thermal barrier. Thus, stiffener 516 may reduce heat flow from the shaft 504 to the rotor 330. The shaft may be subjected to high heat loads from exhaust gases and hot, pressurized air in the compressor 400. The stiffener may be an assembly of a precision interference fit of two or more, highly controlled cylindrical parts to provide a mechanism of attachment between both the rotor and the stiffener, and the stiffener and the shaft. Splines or other serrated torque transmission mechanisms are alternatives, though they may be less desirable because of the difficulty in holding tolerances and increased local stress on the parts.

Shaft 504 may be stepped so that bearings 510 and 512 are of different sizes to accommodate differences in the shaft's outside diameter at the respective bearing. Each shaft bearing may include a journal bearing and a thrust bearing to permit rotation between parts while resisting axial loads. A single thrust bearing that resists axial loads in both axial directions may suffice. Thrust bearings rely upon a thin layer of pressurized oil or other liquid to support axial thrust. Likewise, a thin layer of oil in the journal bearings may separate the shaft 504 from the bearing structure and the motor housing 302. Rolling element bearings or a combination of rolling element and journal and thrust bearings also may be used.

Motor housing 302 may include interior structures that substantially encase stator 332 and rotor 330. Motor housing 302 may include one or more channel 340, which connect to the oil inlet 308. See FIGS. 4, 5 and 6.

Figure 6:
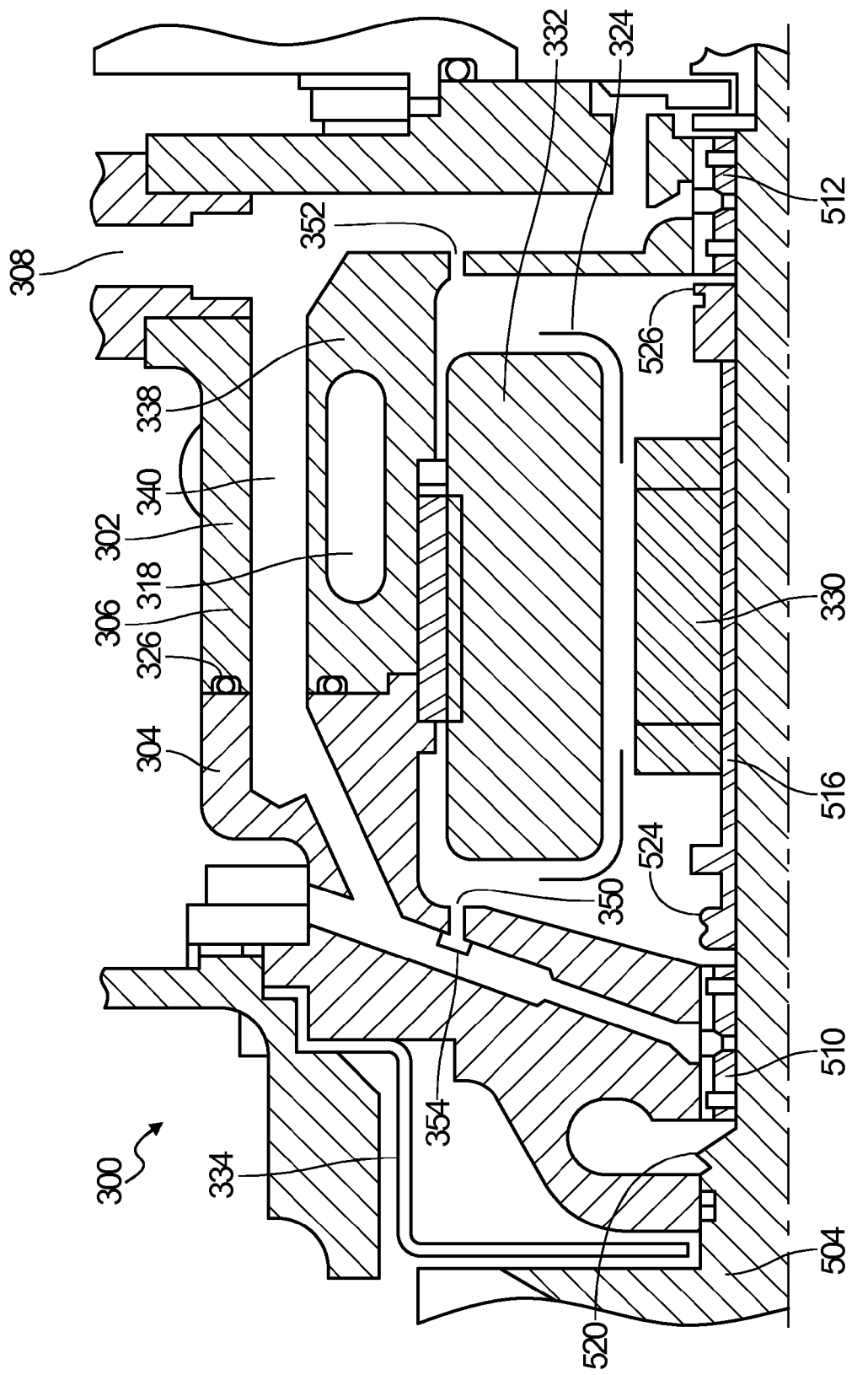
FIG. 6 is an enlarged portion of part of FIG. 5.

Motor housing 302 may include one or more ducts 350 and 352, which jet oil from channel 340. See FIGS. 4 and 6. The ducts may act as nozzles to shoot oil against stator 332. The ducts may include separate nozzles or similar structures to dispense the oil. Likewise, the ducts may have shapes that cause the oil to exit the ducts in desired patterns such as fans, cones, straight streams, slow dribbles or other patterns or combinations of the patterns depending on the particular application. In addition, some ducts may spray in one pattern, and other ducts may spray in other patterns. Further, one or more ducts may have valves that cause the ducts to spray oil at predetermined intervals. The ducts may be sized to provide ample oil for cooling the stator without depriving bearings 510 and 512 of oil. In FIGS. 4 and 6, the ducts shoot oil from the sides of stator 332, but the ducts can be positioned elsewhere relative to the stator as long as an adequate supply of oil contacts the stator. For example, if one oil jet is used, it may be positioned to be sprayed at the top of the stator against the stator laminations so that the oil drains under gravity over the stator coils. Jets also could be positioned to spray oil in an axial or oblique direction. Additional ducts and/or openings may be provided throughout the motor housing and aimed so that oil reaches desired locations on the stator. Accordingly, oil from the engine crankcase or from another source of oil may be used to cool motor 300 and lubricate shaft bearings 510 and 512.

Stator 332 may be designed with exposed coils so that oil reaches the coils themselves. Oil is an electrical insulator so allowing oil to contact the coils will not cause shorts or allow electrical flow to adjacent coils or other structure in the motor. The stator may have one or more fins (not shown) to aid dispersing heat.

Because oil is used to cool stator 332, the oil supply for the bearings should be of sufficient capacity to compensate for oil used for cooling. A heat exchanger or other system for cooling the oil may be provided at appropriate locations in the oil system.

Ducts 350 and 352 may include respective valves to retard oil flow until the oil pressure reaches desired levels. See valve 354 shown schematically in FIG. 6. For example, the valves may open to spray oil onto the stator 332 only when bearings 510 and 512 have or are estimated to have sufficient oil. The valves can maintain a minimum oil pressure to the bearings without allowing oil pressure to drop because of oil flowing to the stator for cooling. Nevertheless, although a short delay pumping oil onto the stator for cooling may be acceptable to keep sufficient oil pressure for the bearings, the stator may begin heating quickly. Therefore, oil pressure to the bearings should reach operating pressure quickly so that oil can flow onto the stator quickly.

The oil flows around stator 332 and its coils and drips off into chamber or sump 336 (FIGS. 4 and 5). To keep oil off rotor 330, tray 324 (FIG. 6) may extend under part of the stator. The tray may extend about 180° around the stator. The tray may have one or more drains. When the oil reaches the edges of the tray, the oil drips into sump 336.

Oil in sump 336 may flow though an oil outlet 314 (FIGS. 2, 3, 4 and 5) from which the oil returns to the crankcase or other oil reservoir. The oil outlet may be sized and positioned appropriately to allow full drainage of oil at reasonable vehicle attitudes (slopes, tilt angles and angular and linear acceleration).

Vacuum pump 316 (FIG. 5) may apply vacuum to outlet 314 to draw oil through the outlet. Low pressure within motor housing 302 caused by the vacuum pump could pull exhaust gases from turbine 200 into the motor housing. Vent 356 (FIG. 2) may be included in the motor housing through which fresh ambient or crankcase air flows to prevent a vacuum from forming in the motor housing. Thus, the vent can prevent pulling exhaust gas into the motor housing 302. To prevent the vent from drawing water or other contaminates into motor 300, a filter, charcoal canister, one-way valve or other blockage device may be included.

Uncontaminated oil is a good electrical insulator, but oil can become contaminated with metal particles and water, both of which can be harmful to electrical devices. Therefore filtering out contaminates and separating out water from oil used in turbocharger 100 may be merited. Conventional engine oil filters and oil/water separators likely are adequate for filtering crankcase oil for engine lubrication. If they are inadequate for the turbocharger's requirements, special oil filters and oil/water separators may be used.

The oil used for cooling may be subject to aeration. Therefore, having the oil flow through an air separator may be merited. In addition, shaft 504, stiffener 516 and rotor 330 may generate wind shear inside the entire cavity that motor housing 302 forms. The positioning and direction of ducts 350 and 352 and any other oil openings and ducts should account for the wind shear. Accordingly, the oil should not be sprayed against the flow of wind shear such that the oil does not slow the flow of air and thereby undesirably slow the rotor. At minimum, one of these ducts must be present to provide the stator coils with direct contact oil cooling. Having more than one duct may be more desirable because they provide more even distribution of the oil cooling around the stator.

To account for the flow of wind shear inside the rotor, the ducts likely should direct oil nearly tangentially to the stators circumference and in the direction of the internal motor housings wind shear. The jets can face the stator from an axial or a radial direction or any oblique combination thereof. For example, the jets could be placed in, or at least concentrated in circumferential positions between the 9:00 or 10:00 to 2:00 or 3:00 positions.

Moving the oil off the motor parts may be merited. Oil that overheats on the stator 332, shaft 504 or stiffener 516 may start coking at about 280° C. Coking on the shaft or stiffener can affect the balance of shaft 504 and increase the shaft's and stiffener's inertia. Coking oil also may plug up passages including ducts 350 and 352. Even if coking does not occur, oil on the shaft or stiffener can affect shaft balance negatively and can increase inertia and drag resistance undesirably.

Thus, the shaft may include one or more flingers, which are geometric features that shed fluid radially outward as they rotate. For example, oil flingers 520 and 522 (FIGS. 5, 8 and 9) may be positioned on the shaft to keep oil out of the turbine 200 and compressor 400. That is, as any oil flows along the shaft toward the turbine or compressor, the oil encounters the flingers where it is flung radially outward away from the turbine or compressor. Either the oil is flung into sump 336, or the oil is flung toward other structure in motor housing 302 and drips from there into the sump.

Because the flingers remove oil from the shaft 504, the effective mass of the shaft does not increase significantly due to oil on the shaft. Therefore, lag from the inertia effects during quick spool-up of the turbocharger 100 is reduced. The oil flingers also may contribute to the de-aeration of the oil by removing the oil from the spinning shaft and throwing it onto the stator coils and motor housing walls.

Shaft assembly 500 may have flingers aligned with the sides of stator 332, for example, flingers 524 and 526 around stiffener 516 (FIG. 5). These flingers may circulate oil back onto the stator 332. Oil may have to be aimed to avoid tray 324 although spraying oil on the outside of the tray will conduct heat away from the tray. Any temperature decrease of the tray may draw heat from the stator.

Additional flingers 524 and 526 may be included to shed oil away from the rotor 330, or to shed oil in a direction that reaches and further cools stator 332.

The flingers may be added to or incorporated into shaft 504, stiffener 516 or some other component coupled to the shaft.

Motor housing 302 may form one or more passageways 318 in wall 338 (FIGS. 5 and 6), which surround stator 332. The passageway may connect to the coolant inlet 320 (FIG. 3) through which coolant may flow. The coolant may be the coolant from the existing engine cooling system. Coolant from a cooling system other than the vehicle's system, such as engine oil or a separate oil system may be used with the passageways. Ambient air could also be used, although air may not conduct heat as well as most liquids.

If passageway 318 carries oil, wall 338 may include radial or other openings to allow oil to drip or spray onto the coils of stator 332.

A heat conducting medium 346 (FIG. 6) of a material that conducts heat well (e.g., aluminum or copper) contacts stator to transmits heat from the stator to wall 338 and the coolant in passageway 318. The coolant cools the surrounding structures of motor housing 302 to conduct heat from the motor housing and other parts of motor 300.

Coolant inlet 348 (FIG. 2) and coolant outlet 320 (FIG. 3) to passageway 318 (FIGS. 5 and 6) may be positioned so that coolant travels around most of stator 332 from the coolant's entry into the passageway to the coolant's draining from the passageway. The heat removed by the coolant adds to the heat load of the engine cooling system. Thus, the engine's cooling system may need to be larger or have a greater capacity to expel the added heat load.

As an example of the turbocharger's operation, consider the situation where a vehicle engine is at idle while the vehicle is at a traffic light. If the driver wants to accelerate rapidly, the exhaust energy to the turbocharger naturally lags. The amount of exhaust gas alone may be unable then to provide sufficient torque to rotate turbine 200 fast enough. Consequently, the shaft 504 would not rotate fast enough for the compressor 200 to provide effective boost.

Meanwhile, controller 600 obtains speed information about the shaft 504 and/or the rotor 330 from a speed sensor (not shown). A temperature sensor adjacent to or in contact with stator 332 may feed stator temperature data to the controller. The controller also may receive data from sensors about the current operation of the engine, such as throttle information, exhaust output and air input.

Using these data, the controller 600 determines when the shaft speed is undesirably low and causes motor 300 to spin. The motor rotates shaft 504 to drive compressor 400 to provide desired boost. The motor increases speed quickly, which spins the compressor much sooner than turbine 200 could do on its own. When engine exhaust gas becomes sufficient to drive the turbine, the controller may cause a decrease or cut in electrical power to the motor.

Figure 10:
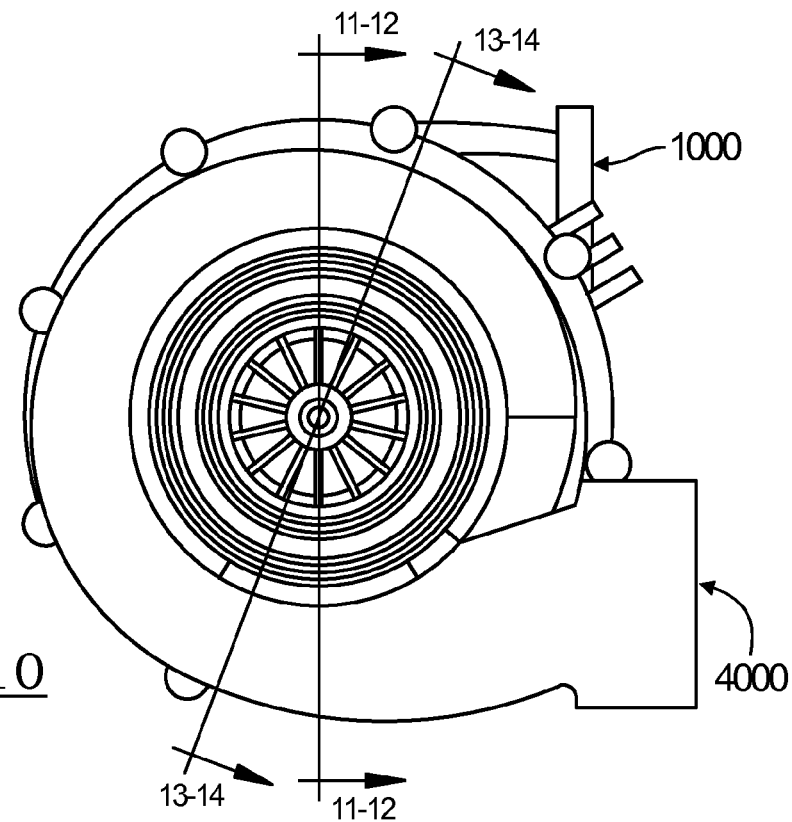
FIG. 10 is a plan view of the compressor end of a turbocharger.

FIG. 10 illustrates another embodiment of the electrically controlled turbocharger 1000. The end view of the compressor end 4000 shows two section lines XI-XII and XIII-XIV for later reference in the following figures.

FIG. 10 illustrates another embodiment of the electrically controlled turbocharger 1000. The end view of the compressor end 4000 shows two section lines XI-XII and XIII-XIV for later reference in the following figures.

Figure 11:
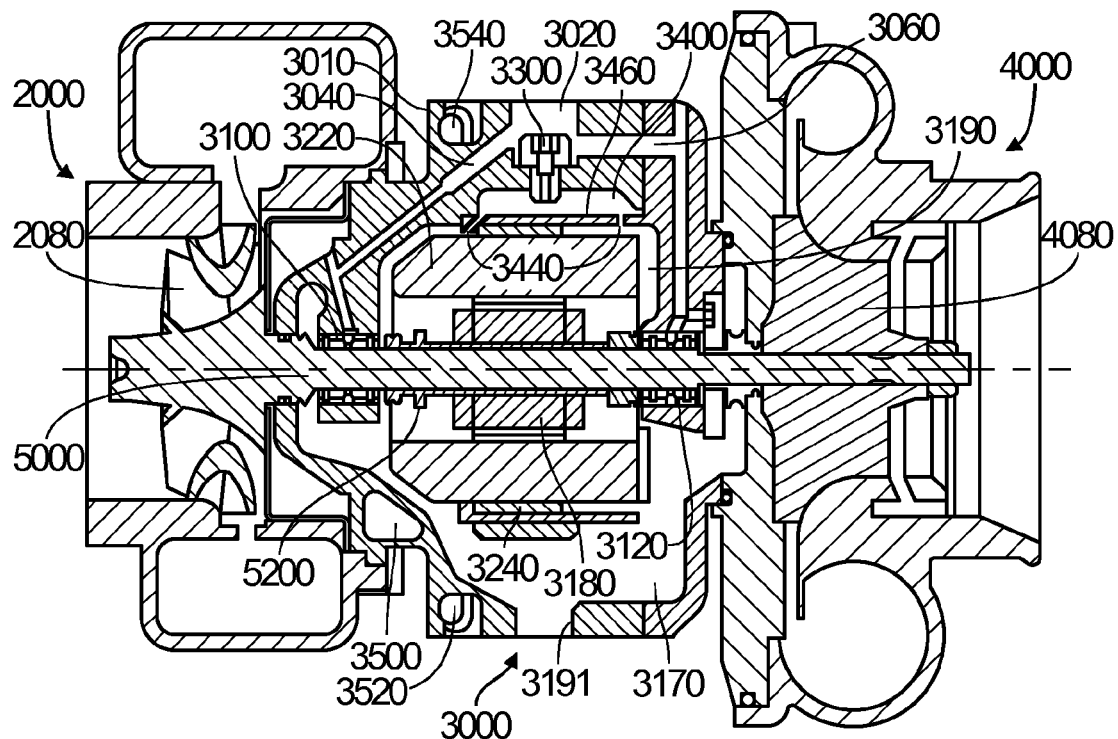
FIG. 11 is a cross-sectional view of the turbocharger in FIG. 10, taken along section lines II-III featuring the oil supply and cooling jacket.
Figure 12:
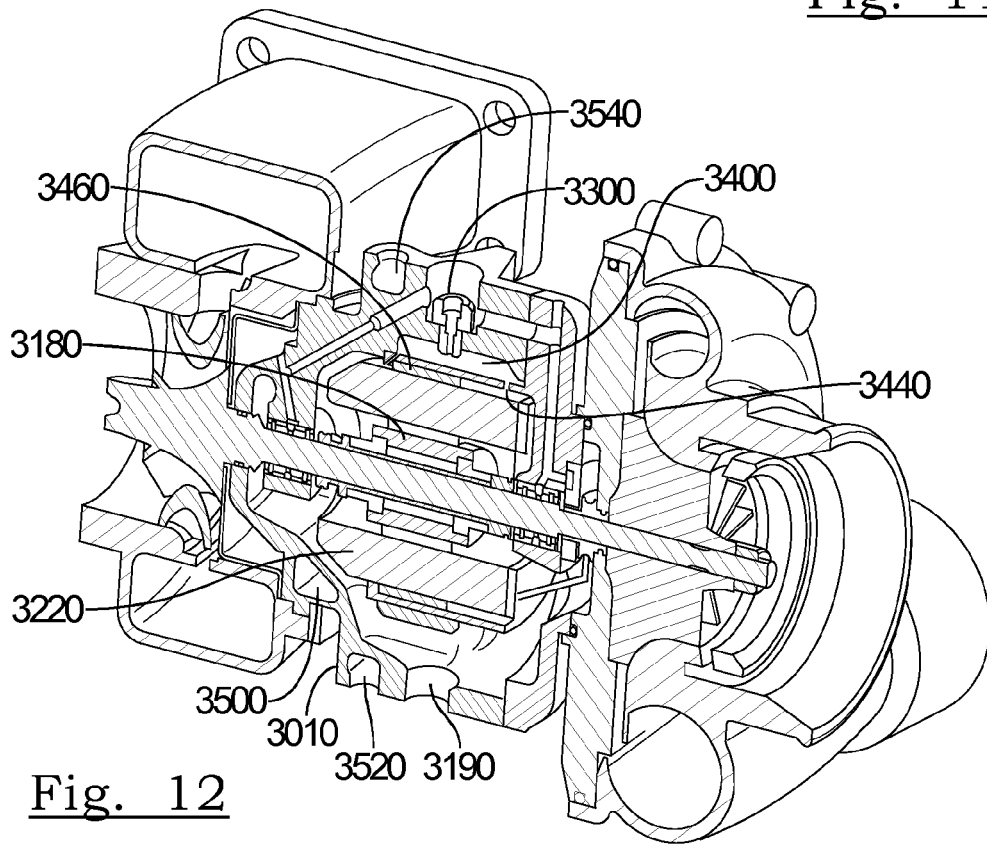
FIG. 12 is a cross-sectional solid model view of the turbocharger in FIG. 10, taken along section lines II-III featuring the oil supply and cooling jacket.

FIGS. 11 and 12 are cross-sectional views taken along section line 11-12 in FIG. 10. FIGS. 11 and 12 show turbine section 2000 with turbine blade 2080, motor section 3000, compressor section 4000 with a compressor blade 4080 and shaft 5000 joining the rotating components together. Shaft 5000 is provided with a shaft stiffener 5200. This embodiment differs from those discussed previously for its inclusion of an oil cooling gallery 3400 within motor housing 3010, an apertured stator sleeve 3460 that surrounds stator windings 3240 and a coolant jacket 3500 formed in the housing 3010 between the turbine 2000 and the motor components.

Lubricating oil inlet 3020 in housing 3010 allows lubricating oil to be fed through bearing lube passages 3040 and 3060 to respective bearings 3100 and 3120. As can be seen, excess oil under relatively high pressure is pumped through bearings 3100 and 3120 and falls into sump 3170, where it exits the motor housing 3010 through oil drain 3195. Lubricating oil also passes through a reduction valve 3300 and into oil cooling gallery 3400 under a relatively low pressure, as compared to that which is pumped through the bearings. Stator sleeve 3460 provides a barrier between oil cooling gallery 3400 and the stator windings 3240 on the stator 3220. A plurality of apertures 3440 in stator sleeve 3460 form jets through which the oil from oil cooling gallery 3400 is sprayed directly on the stator windings 3240 on the stator 3220 in the motor cavity 3190 to provide cooling thereof. Sprayed oil then passes via gravity past the rotor 3180 and into sump 3170 where it is drained from the turbocharger, through oil drain 3191 with oil used to lubricate the bearings.

Figure 13:
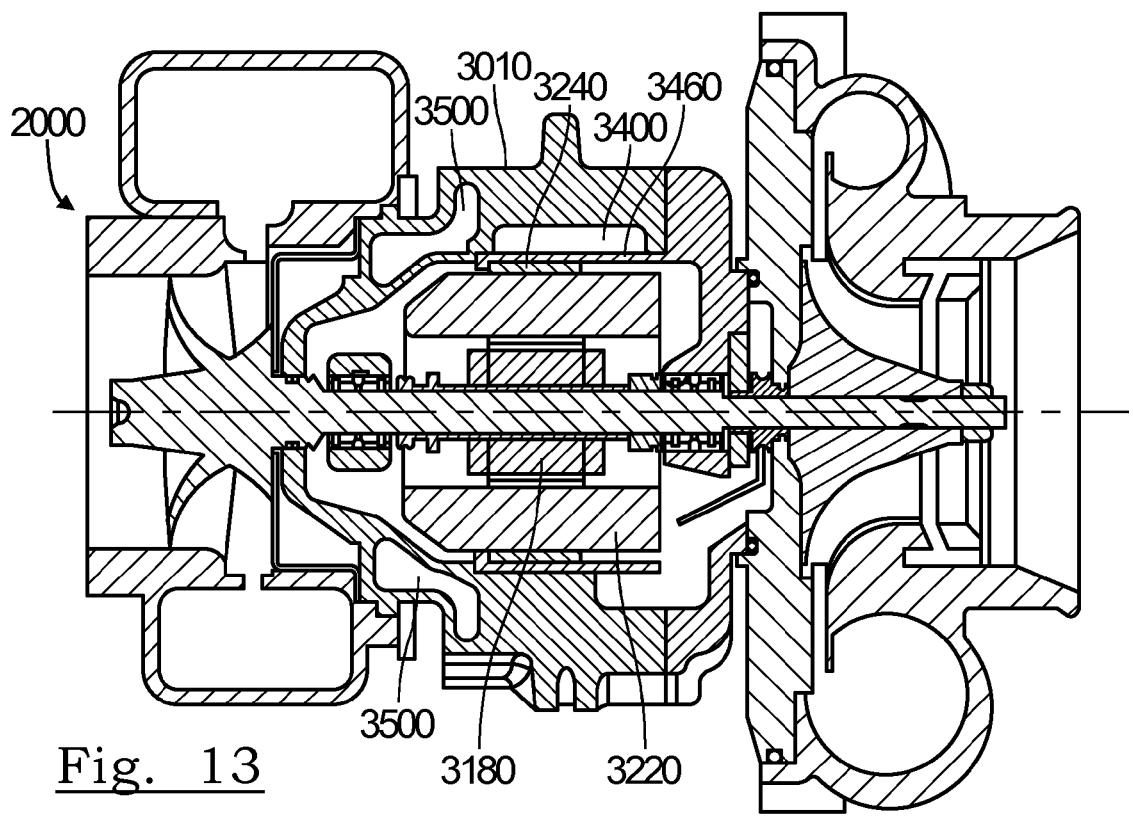
FIG. 13 is a cross-sectional view of the turbocharger in FIG. 10, taken along section lines IV-V featuring the cooling jacket.
Figure 14:
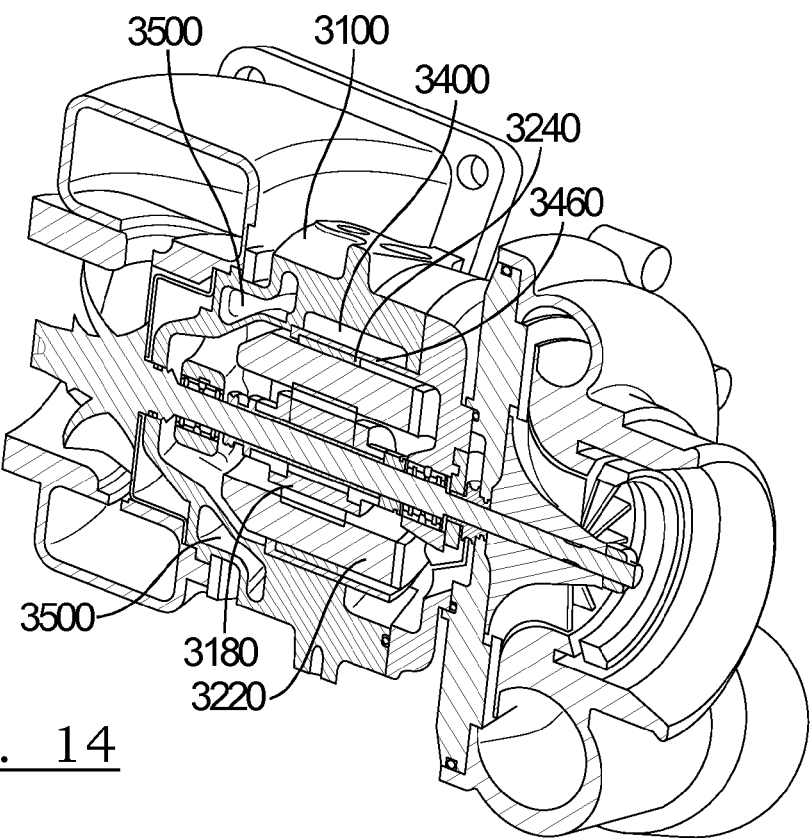
FIG. 14 is a cross-sectional solid model view of the turbocharger in FIG. 10, taken along section lines IV-V featuring the cooling jacket.
Figure 15:
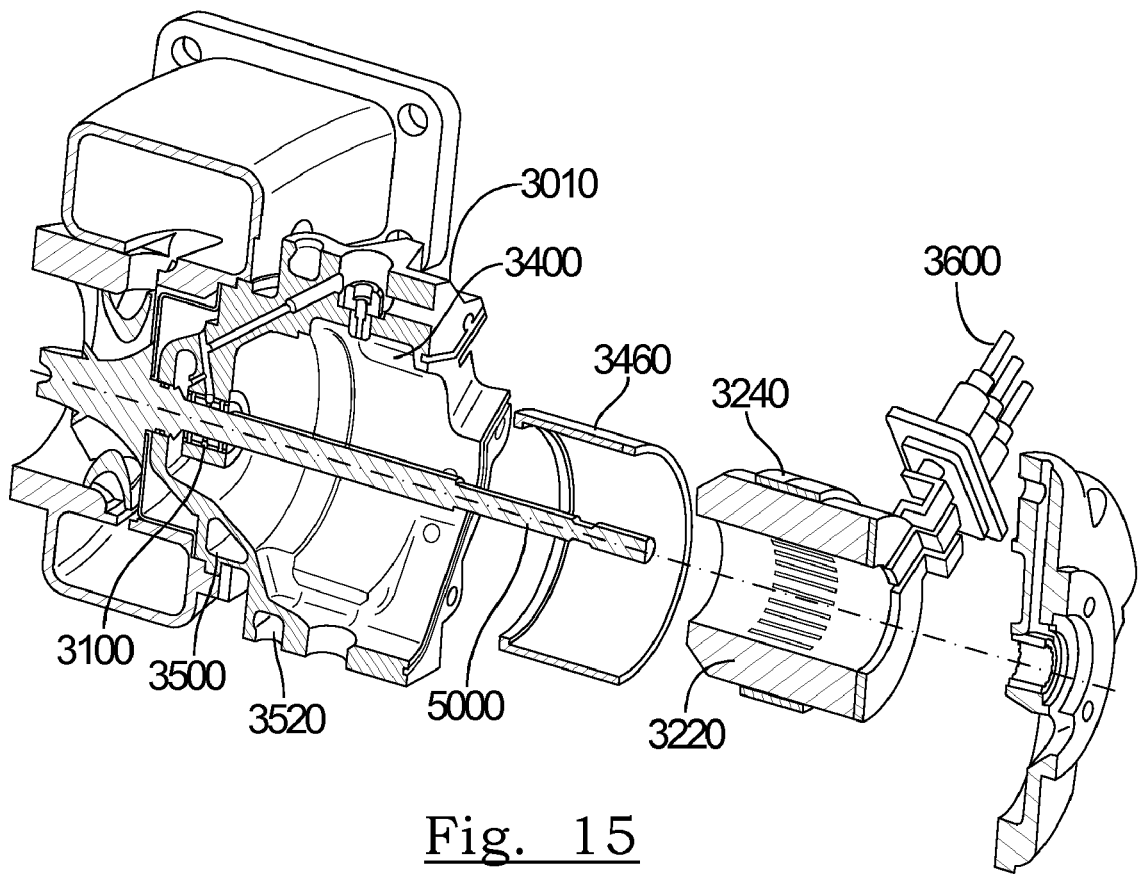
FIG. 15 is a cross-sectional solid model exploded view of a portion of the turbocharger in FIG. 10 taken along section lines II-III.
Figure 16:
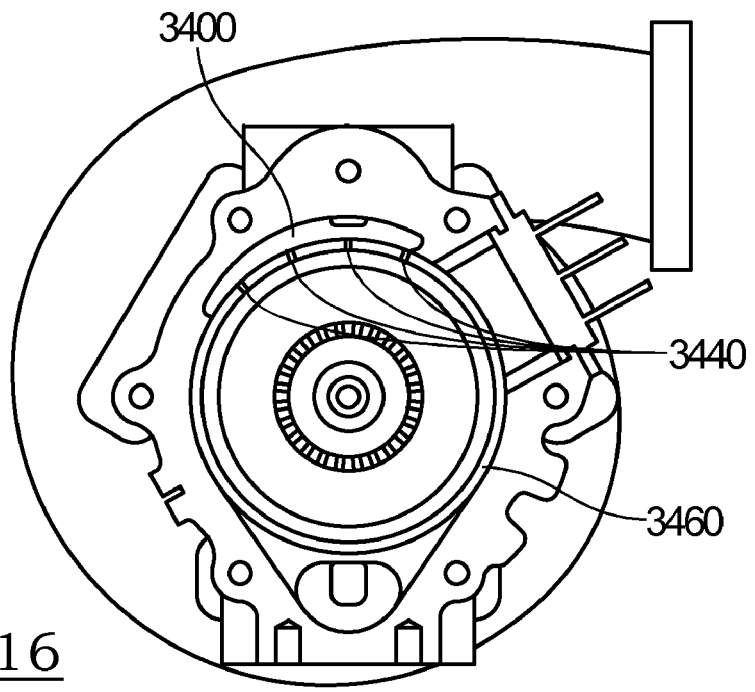
FIG. 16 is cross-sectional solid model view of an electric motor housing portion of a turbocharger.

In addition to the stator spray configuration, the embodiment shown in FIGS. 11 and 12 contain a coolant jacket 3500 that is formed in the turbine end of the motor housing 3010 to allow for the circulation of liquid coolant such as an antifreeze mixture of Ethylene Glycol and water. Coolant jacket 3500 has an inlet 3520 and an outlet 3540. The coolant jacket 3500 configuration and location can also be seen in FIGS. 13 and 14 (rotated cross-sectional views taken along section line 13-14 in FIG. 10) and in FIGS. 15 and 17. In FIG. 13, arrows designated as "H" are used to illustrate the path of migration of heat from the exhaust gases in the turbine section 2000 towards the electric motor and bearing components. As can be seen in those figures, the coolant jacket 3500 interrupts the heat flow path to the electric motor and by the circulation of liquid coolant draws heat out of the turbocharger. As a result, the temperatures of electric motor components are controlled to remain within an acceptable range for long term operation.

Figure 17:
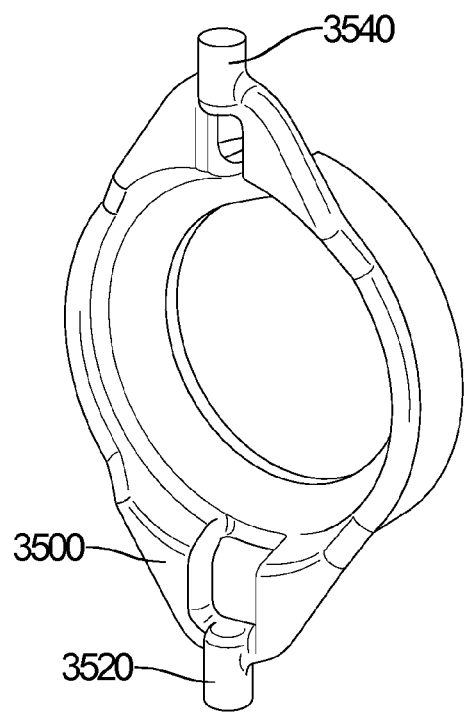
FIG. 17 is a solid model representation of the water coolant jacket core.

FIG. 17 is a representation of the coolant core form-3500 used to form coolant jacket 3500. As can be seen, the inlet form-3520 and outlet form-3540 are the reverse of the void that is formed in the motor housing during casting.

Figure 18:
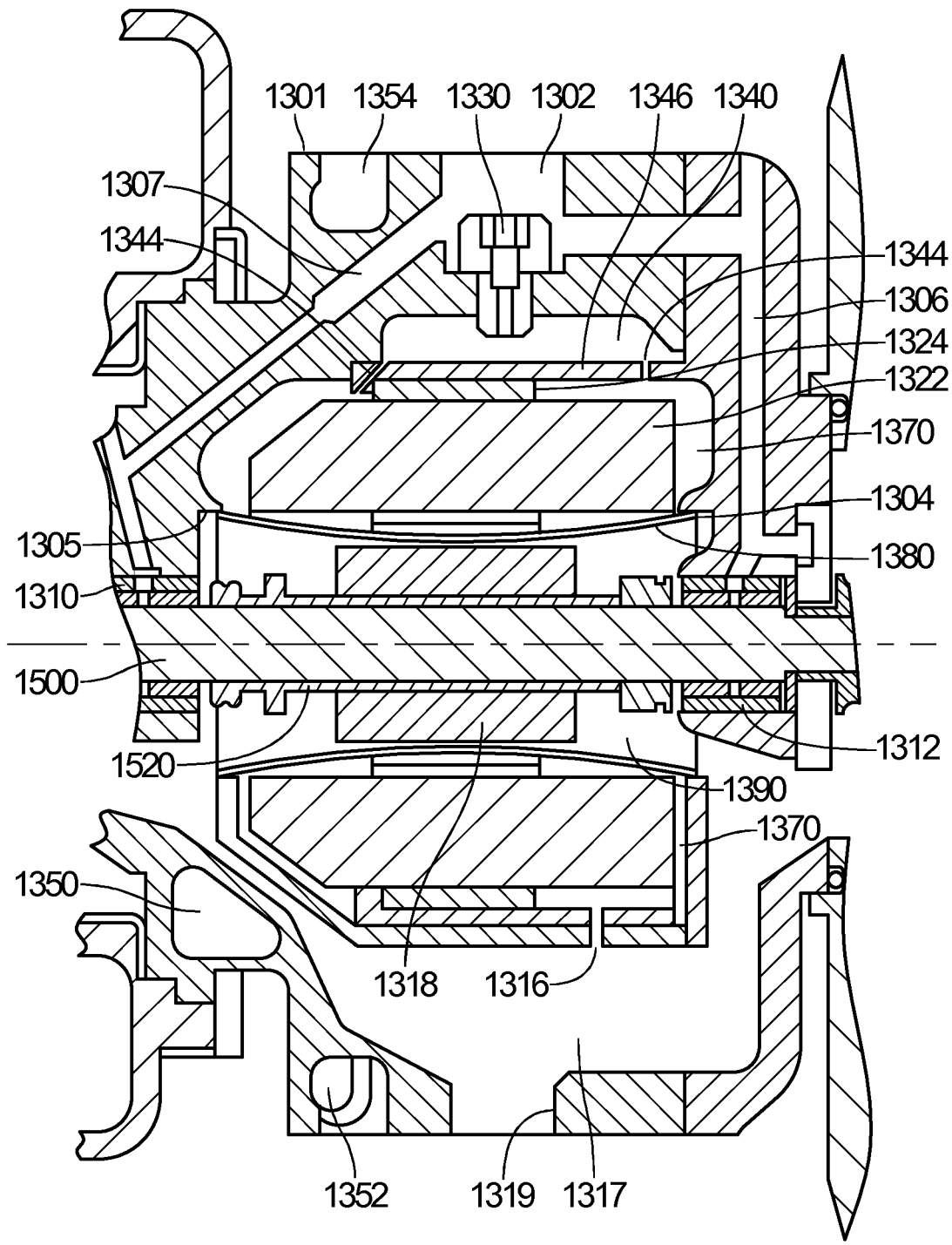
FIG. 18 is cross-sectional view of a portion of another embodiment of a turbocharger showing a portion of the motor stator coil submerged in cooling oil spray.

FIG. 18 is another embodiment that shows an alternative for providing oil spray cooling to the electric motor stator to a point where the stator windings are submerged in cooling oil yet separated by an air gap from the rotor. Lubricating oil inlet 1302 in housing 1301 allows lubricating oil to be fed through bearing lube passages 1307 and 1306 to respective bearings 1310 and 1312. As can be seen, excess oil under relatively high pressure is pumped through bearings 1310 and 1312 and falls into sump 1317, where it exits the motor housing 1301 through oil drain 1319. Lubricating oil also passes through a pressure reduction valve 1330 and into oil cooling gallery 1340 under a relatively low pressure, as compared to that which is pumped through the bearings. Stator sleeve 1346 provides a barrier between oil cooling gallery 1340 and the stator windings 1324 on the stator 1322. A plurality of apertures 1344 in stator sleeve 1346 form jets through which the oil from oil cooling gallery 1340 is sprayed directly on the stator windings 1324 on the stator 1322 in the stator cavity 1370 to provide cooling thereof. This embodiment differs from that described immediately above, in that the stator is contained within a separate stator chamber 1370 from a defined rotor cavity 1390 which contains the rotor 1318. Here, a stationary oil barrier 1380 is formed between stator windings 1324 on stator 1322 and rotor 1318. Stationary oil barrier 1380 can be formed as part of the stator from high temperature plastic, or from a formed non-ferrous sheet metal such as aluminum. As shown, stationary oil barrier 1380 is cylindrical in shape and has a slight waist to accommodate the innermost portions of stator windings 1322, while still retaining the air gap between stator and rotor. A seal is maintained between the ends of stationary oil barrier 1380 and annular stops 1304 and 1305 formed in the housing 1301. In this manner, oil sprayed onto stator windings 1324 on the stator 1322 submerged the stator and circulates through stator cavity 1370 until it drains therefrom at drain hole 1316, where it enters sump 1317 and combines with bearing lubricating oil for removal from sump drain 1319. The purpose of the stationary oil barrier 1380 is to reduce the amount of cooling oil that gets deposited on rotor 1318 and shaft stiffener 1520 that reside on shaft 1500, while also providing maximum stator contact with the sprayed oil. Oil that is pumped through bearings 1310 and 1312 may still enter the rotor cavity 1390, but its volume is much less than earlier described embodiments.

As in the immediately earlier described embodiment, the embodiment in FIG. 18 contains a coolant jacket 1350 having inlets 1352 and outlet 1354 to provide additional cooling of the turbocharger.

Figure 19:
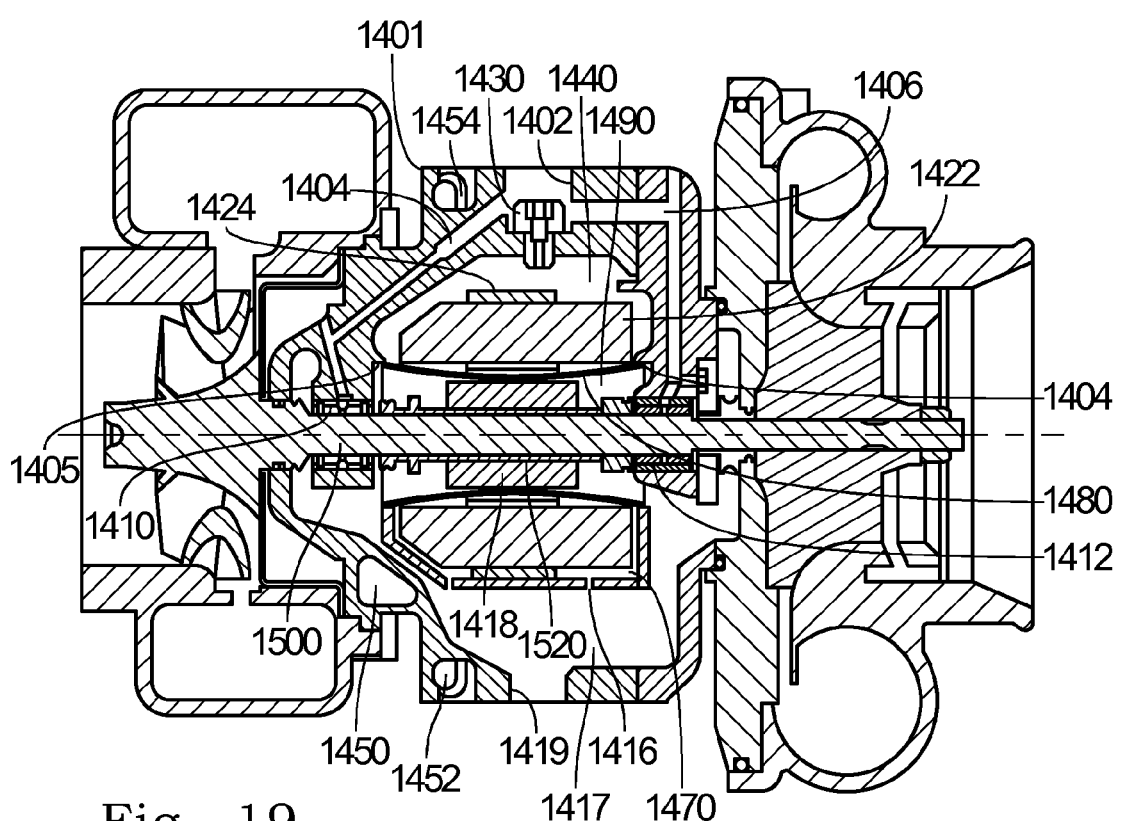
FIG. 19 is cross-sectional view of a portion of another embodiment of a turbocharger showing a portion of the motor stator coil without a stator sleeve being submerged in cooling oil.

FIG. 19 is another embodiment that shows an alternative for providing oil spray cooling to the electric motor stator to a point where the stator windings are submerged in cooling oil yet separated by an air gap from the rotor. Lubricating oil inlet 1402 in housing 1401 allows lubricating oil to be fed through bearing lube passages 1404 and 1406 to respective bearings 1410 and 1412. As can be seen, excess oil under relatively high pressure is pumped through bearings 1410 and 1412 and falls into sump 1417, where it exits the motor housing 1401 through oil drain 1419. Lubricating oil also passes through a pressure reduction valve 1430 and into stator chamber 1440 under a relatively low pressure, as compared to that which is pumped through the bearings. In contrast to the embodiment in FIG. 18, there is no stator sleeve to define an oil gallery separate from the stator chamber. In this embodiment, the oil gallery and stator chamber are one. In this embodiment, the stator windings 1424 on stator 1422 are contained in the stator chamber 1440 and are submerged within the cooling oil. A stationary oil barrier 1480 is formed between stator windings 1424 on stator 1422 and rotor 1418. Stationary oil barrier 1480 can be formed as part of the stator from high temperature plastic, or from a formed non-ferrous sheet metal such as aluminum. As shown, stationary oil barrier 1480 is cylindrical in shape and has a slight waist to accommodate the innermost portions of stator windings 1422, while still retaining the air gap between stator and rotor. A seal is maintained between the ends of stationary oil barrier 1480 and annular stops 1404 and 1405 formed in the housing 1301. In this manner, oil entering stator chamber 1440 submerges stator windings 1424 on the stator 1422 and circulates through and to exit passages 1470 in the lower portion of the stator chamber 1440 until it drains therefrom at drain hole 1416, where it enters sump 1417 and combines with bearing lubricating oil for removal from sump drain 1419. The purpose of the stationary oil barrier 1480 is to reduce the amount of cooling oil that gets deposited on rotor 1418 and shaft stiffener 1520 that reside on shaft 1500, while also maximizing stator contact with the circulating oil. Oil that is pumped through bearings 1410 and 1412 may still enter the rotor cavity 1490, but its volume is much less than earlier described embodiments.

As in several earlier described embodiments, the embodiment in FIG. 19 contains a coolant jacket 1450 having inlets 1452 and outlet 1454 to provide additional cooling of the turbocharger.

Closing Comments:

Throughout this description, the embodiments and examples shown should be considered as exemplars, rather than limitations on the apparatus and procedures disclosed or claimed. Although many of the examples involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the described methods. Acts, elements and features discussed only in connection with one embodiment are not intended to be excluded from a similar role in other embodiments.

For means-plus-function limitations recited in the claims, the means are not intended to be limited to the means disclosed in this application for performing the recited function, but are intended to cover in scope any means, known now or later developed, for performing the recited function.

As used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims. Use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

We claim:

1. A method of cooling the stator component of an electric motor in an electrically controlled turbocharger, comprising the steps of:

providing a housing structured to support a main shaft for rotation and to separately contain components of a turbine, said electric motor and a compressor;

mounting said shaft on bearings at either end of said housing that contains said electric motor components to result in said shaft supporting for rotation therewith a turbine blade, and electric motor rotor and a compressor blade;

forming oil lubrication passages in said housing for receiving lubricating oil from a separate source and for directing oil to each of said bearings;

providing an oil cooling gallery in said housing in communication with said stator component of said electric motor;

providing a pressure reduction valve between said passages and said oil cooling gallery to pass oil from said separate source at a relatively reduced pressure to said oil cooling gallery and to provide said oil directly to said stator component to effect cooling thereof; and providing said oil gallery with an apertured wall adjacent said stator component and spraying said oil directly onto said stator component.

2. The method as in claim 1, further including the steps of providing said housing with a sump for receiving excess oil as it flows through said bearings and for receiving oil provided directly to said stator component and a drain for allowing said excess oil to be removed from said housing.

3. The method as in claim 2, further including the steps of providing a liquid cooling jacket in said housing to surround the bearing located between said turbine and said motor, and to interrupt a heat conduction path existing in said housing between said turbine and said motor; and circulating coolant liquid from an external source through said coolant jacket.

4. The method as in claim 1, further including the steps of providing said oil gallery to surround said stator component and submerging said stator component in oil received from said reduction valve.

5. An electrically controlled turbocharger comprising: a turbine, a compressor and an electric motor, a housing and a main shaft; said housing structured to support said main shaft for rotation and to have portions which separately contain components of said turbine, said electric motor and said compressor; said shaft being mounted on bearings at either end of said housing portion that contains said electric motor components and; said shaft supports a turbine blade, an electric motor rotor and a compressor blade for rotation therewith; said housing is formed to contain oil lubrication passages which receive lubricating oil from a separate source of oil and direct oil to each of said bearings; said housing contains an oil cooling gallery adjacent the stator component of said electric motor; said oil cooling gallery being in communication with said passages through a pressure reduction valve to receive oil from said source of oil at a relatively reduced pressure and to direct said oil onto said stator component wherein said oil cooling gallery contains a wall that separates said gallery from said stator component and said wall contains a plurality of apertures that allow oil within said gallery to be sprayed directly onto said stator component.

6. The electrically controlled turbocharger as in claim 5, wherein said housing defines a motor cavity that surrounds said stator and rotor components and contains a sump portion below said rotor component that allows said sprayed oil and said oil from said bearings to collect by gravity and be drained therefrom.

7. The electrically controlled turbocharger as in claim 5 wherein said aperture wall of said cooling gallery is formed by a sleeve attached to said stator component said apertures in said sleeve are disposed to form jets which allow oil to be sprayed directly onto said stator component.

8. The electrically controlled turbocharger as in claim 5, wherein said oil cooling gallery contains said stator component and said oil flows directly over said stator component.

9. The electrically controlled turbocharger as in claim 5, wherein said housing is formed to contain a cooling jacket to surround a bearing located between said turbine and said motor and said cooling jacket is located within a heat conduction path existing in said housing between said turbine and said motor and said cooling jacket is configured to receive liquid coolant from an external coolant source and to pass said coolant back to said source.

10. An electrically controlled turbocharger comprising a turbine, a compressor and an electric motor, a housing and a main shaft; said housing structured to support said main shaft for rotation and to separately contain components of said turbine, said electric motor and said compressor; said shaft being mounted on bearings at either end of said housing that contains said electric motor components and; said shaft supports, for rotation therewith, a turbine blade, an electric motor rotor and a compressor blade; said housing is formed to contain a cooling jacket to surround the bearing located between said turbine and said motor and located within a heat conduction path existing in said housing between said turbine and said motor; said cooling jacket configured to receive coolant liquid from an external source and to pass said coolant back to said source; said housing further containing oil lubrication passages to supply lubricating oil from an external source to each of said bearings, a sump for receiving excess oil as it flows through said bearings and a drain for allowing said excess oil to be removed from said housing; said housing contains an oil chamber in communication between said lubrication passages and the stator component of said electric motor to supply lubricating oil directly onto said stator component wherein said oil chamber is in communication with said lubrication passages through a pressure reduction valve to receive oil from said source of oil at a relatively reduced pressure from that present in said passages and said oil chamber contains apertures that function as jets to direct said oil onto said stator component.

11. An electrically controlled turbocharger comprising:
a turbine, a compressor and an electric motor, a housing and a main shaft;
said housing structured to support said main shaft for rotation and to separately contain components of said turbine, said electric motor and said compressor;
said shaft being mounted on bearings at either end of said housing that contains said electric motor components and;
said shaft supports for rotation therewith a turbine blade, an electric motor rotor and a compressor blade;
said housing is formed to contain oil lubrication passages which receive lubricating oil from a separate source and direct oil to each of said bearings;
said housing contains an oil cooling gallery adjacent the stator component of said electric motor;
said oil cooling gallery is in communication with said passages through a pressure reduction valve to receive oil from said passages at a relatively reduced pressure and to provide said oil directly to said stator component to effect cooling thereof wherein said oil cooling gallery contains a wall that separates said gallery from said stator component and said wall contains a plurality of apertures that allow oil within said gallery to be sprayed directly onto said stator component.

12. The electrically controlled turbocharger as in claim 11, wherein said shaft is mounted to rotate about a generally horizontal axis and said apertures are disposed above said stator component to allow gravitational flow of said oil onto and over said stator component.

13. The electrically controlled turbocharger as in claim 11, wherein said oil cooling gallery contains said stator component and said oil flows directly onto and over said stator component.

14. The electrically controlled turbocharger as in claim 13, wherein said stator is separated from said rotor component by an air gap and a wall partition of said oil cooling gallery to prevent said cooling oil flowing over said stator component from flowing onto said rotor component.

15. The electrically controlled turbocharger as in claim 14, wherein said shaft is mounted to rotate about a generally horizontal axis and said oil gallery is a stator chamber in which said oil submerges said stator component, and exits into a sump in said housing below said shaft and said stator chamber.

16. The electrically controlled turbocharger of claim 11 further comprising at least one flinger operably connected to the shaft and extending outwardly from the axis of the shaft.

17. The electrically controlled turbocharger of claim 11 further comprising a stiffener around the shaft adjacent the motor.

* * * * *